United States Patent [19]

Beck

[11] Patent Number: 4,815,916

[45] Date of Patent: Mar. 28, 1989

[54] APPARATUS FOR RAISING A MAGNETIZABLE OBJECT FROM A STACK AND FOR MOVING IT AWAY FOR FURTHER PROCESSING

[75] Inventor: James A. Beck, Franksville, Wis.

[73] Assignee: Unico, Inc., Franksville, Wis.

[21] Appl. No.: 245,961

[22] Filed: Sep. 16, 1988

Related U.S. Application Data

[63] Continuation of Ser. No. 30,684, Mar. 27, 1987, abandoned.

[51] Int. Cl.$^4$ ............................ B65H 3/16; B65H 3/46
[52] U.S. Cl. ................................. 414/796.5; 271/18.1; 271/154; 414/796.9; 414/797.1
[58] Field of Search ........................ 271/18.1, 147, 152, 271/153, 154, 901; 414/35, 36, 113, 118, 122

[56] References Cited

U.S. PATENT DOCUMENTS

| | | | |
|---|---|---|---|
| 2,474,141 | 6/1949 | Chatterton | 271/18.1 |
| 2,795,340 | 6/1957 | Hommel | 414/35 |
| 2,848,227 | 8/1958 | Gulick | 271/18.1 |
| 2,973,959 | 3/1961 | Stolk | 271/18.1 |
| 3,716,226 | 2/1973 | Kistner | 271/154 X |

FOREIGN PATENT DOCUMENTS

0137241  8/1982  Japan ................... 271/18.1
1220837  3/1986  U.S.S.R. ................ 414/118

Primary Examiner—Frank E. Werner
Assistant Examiner—Janice Krizek
Attorney, Agent, or Firm—James E. Nilles; Thomas F. Kirby

[57] ABSTRACT

A plurality of magnetic elevator devices disposed along the sides of a vertical stack of magnetizable steel objects, such as sheets or rods, separates them and raises the uppermost one vertically. Sensing devices in a control system sense when the object reaches a transport position and actuate a transport mechanism to move to another location. Each magnetic elevator device comprises a magnetic structure (permanent magnet or electro-magnet) and a pair of elongated, vertically extending, laterally spaced apart contact rails of opposite magnetic polarity which engage the edges of the stacked objects. Each contact rail comprises a magnetic portion having a point of minimum reluctance near its top and a non-magnetic, low-friction surface portion (plastic or stainless steel) which slidably engages each object to guide it and to hold it spaced from the magnetic portion. The pair of contact rails cooperate with the stacked objects to complete a magnetic circuit whereby the objects are repelled from each other, raised and advanced upwardly toward the point of minimum reluctance.

7 Claims, 2 Drawing Sheets

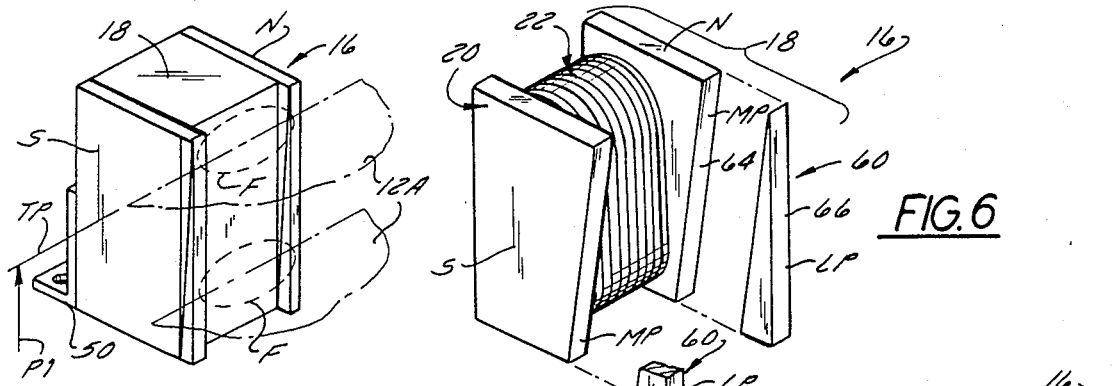
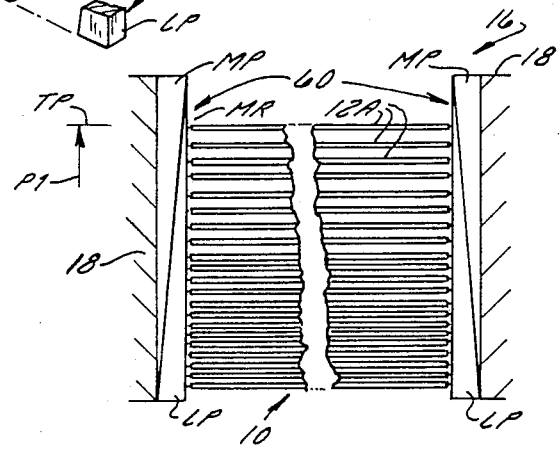
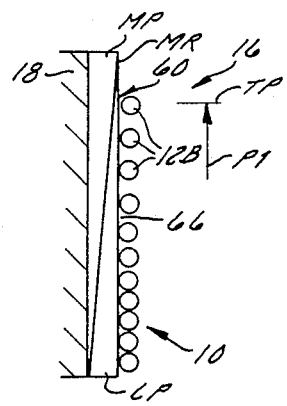
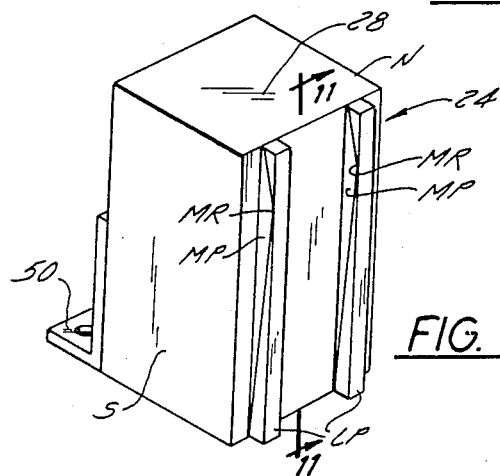
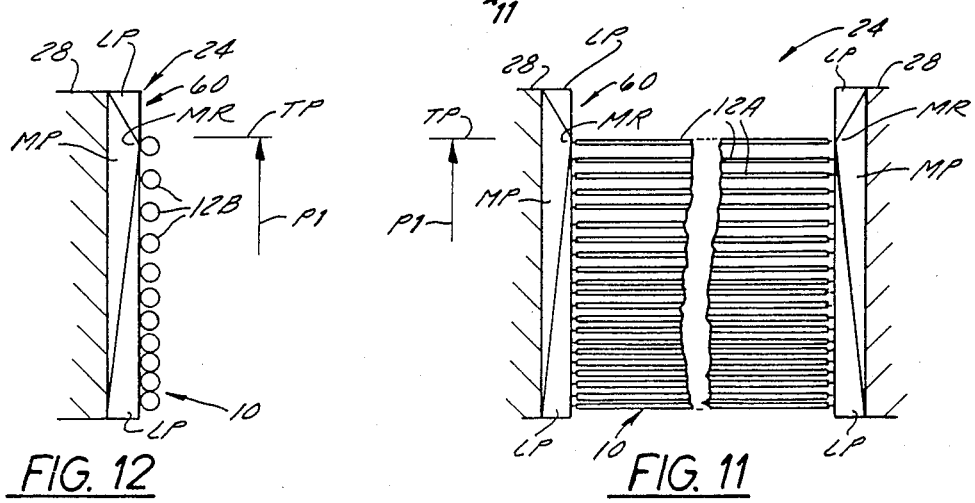

APPARATUS FOR RAISING A MAGNETIZABLE OBJECT FROM A STACK AND FOR MOVING IT AWAY FOR FURTHER PROCESSING

This application is a continuation of application Ser. No. 030,684, filed Mar. 27, 1987, now abandoned.

BACKGROUND OF THE INVENTION

1. Field of Use

This invention relates generally to apparatus having magnetic elevator devices for moving the top or endmost object in a stack of magnetizable objects, such as steel sheets or rods, to a fixed transport position; transport means for then moving the object away from the transport position for processing; and electric control means for operating the transport means.

In particular, the invention relates to the construction of such magnetic elevator devices.

2. Description of the Prior Art

In some industrial processes, a stack of objects, such as metal sheets or rods, are provided at one location. Periodically, the uppermost or endmost object in the stack is removed from the stack and moved to another location of processing by suitable transport means. Removal and transport of the uppermost object can be facilitated if it is moved to a fixed "transport position" wherein it can be easily grasped by the transport means. In some cases, the entire stack is moved as each successive uppermost or endmost object is removed from the stack so as to ensure that the next object to be removed is automatically disposed in the transport position. In other cases, the stack itself remains stationary and means are provided to raise only the uppermost or endmost object to the transport position. The transport means may take various forms and may, for example, comprise a head member which is selectively movable vertically and horizontally between the transport position and some other location to which the objects are to be transported. The head member is provided with selectively operable lifting devices to releasably engage the object in the transport position. The lifting devices may take the form of mechanical jaws or clamps or suction cups. In cases where the objects are fabricated of magnetizable metal, such as iron or steel sheets or rods, it is possible to use electro-magnetic lifting devices to releasably engage the objects. However, there is a possibility that the lifting magnet might simultaneously attract the uppermost metal object, as well as the metal object immediately beneath or adjacent to it in the stack. Therefore, it is desirable that the magnetic object which reaches transport position be physically separated or spaced from the next adjacent object in the stack.

Apparatus and devices for magnetically separating, moving and positioning magnetizable sheet-like members arranged in a stack are known and the following U.S. patents illustrate the state of the art. Typically, the prior art apparatus and devices are designed for very specialized purposes and some require additional mechanical lifting devices to raise the stack of members upon which the magnetic devices act.

U.S. Pat. No. 2,474,141 (Chatterton) discloses apparatus wherein a stack of magnetizable metal sheets is raised vertically by a movable platform and permanent magnetic devices located along an edge or edges of the sheets nearest the top of the stack effect magnetic separation. Non-magnetic guides associated with the magnets slidably engage the sheet edges to facilitate their upward movement.

U.S. Pat. No. 3,353,822 (Dangelmaier et al) discloses apparatus wherein sets of electro-magnetic devices arranged in alignment one above the other and are electrically switched on and off sequentially to provide a traveling magnetic field which raises magnetizable metal blanks from a stack. Metal guides engage the blank edges to provide a transport channel to facilitate upward movement.

U.S. Pat. No. 4,465,415 (Eberling et al) discloses apparatus wherein a stack of magnetizable laminations is raised vertically by a movable platform and a magnetic device in the form of a mandrel extends into a central hole of the lamination to spread them apart. The magnetic device comprises a series of electromagnets arranged in alignment one above another. The electromagnets are switchable on and off to produce desired lifting effects.

SUMMARY OF THE INVENTION

Apparatus in accordance with the invention is employed with a stack of magnetizable objects, such as iron or steel sheet or rods. The apparatus operates to move the uppermost or endmost object in the stack along a path to a predetermined fixed transport position wherein the object is separated or spaced from the next adjacent object in the stack. The apparatus further operates to move the object away from the transport position and away from the stack to another position or location wherein the object can be subjected to some sort of industrial process, such as cutting, punching, stamping, bending, etc.

The apparatus in accordance with the invention generally comprises three basic elements or systems, namely, one or more magnetic elevator devices arranged and constructed in accordance with the invention, transport means, and control means.

More specifically, one or more magnetic elevator devices are provided for disposition alongside the stack and alongside the path. The magnetic elevator devices operate to separate the uppermost or endmost object in the stack and to move it along the path to the transport position. As hereinafter explained, a magnetic elevator device may be either a "passive" type device (wherein a permanent magnet structure is employed and magnetic flux density is fixed and not controllable) or an "active" type device (wherein an electro-magnet structure comprising a magnet core and electric coil is employed and magnetic flux density is adjustably variable or controllable).

The transport means is provided for releasably engaging the object in the transport position and for moving it away from the transport position and away from the stack to another position or location wherein it is deposited for further processing. Preferably, the transport means comprises a transport head which is selectively movable vertically and horizontally by means of a controllable motor and further comprises a selectively energizable electro-magnetic lifting device mounted on and movable with the transport head.

The control means includes sensing means or sensing devices, such as photo-electric cells, for ascertaining the position of an object relative to the transport position and includes means to effect operation of the transport means when the object arrives at the transport position. If active type magnetic elevator devices are employed in the apparatus, then the control means is further operable to sense the position of the object relative to the transport position and, if necessary, to control flux density in the elevator device to precisely position the object in the transport position before effecting operation of the transport means.

Each magnetic elevator device in accordance with the present invention (whether an active or passive device) comprises a supporting structure, a magnetic structure (permanent magnet or electro-magnet) having opposite poles (north and south), and a pair of elongated, laterally spaced apart contact rails. The contact rails are located on the support structure and are magnetically coupled to the magnetic structure so as to be of opposite magnetic polarity. The magnetic elevator device is adapted to be disposed adjacent a side of the stack and the path along which the objects travel. The contact rails are adapted to engage a side edge of the stacked objects, and well as those being moved along the path to the transport position. In a typical installation wherein the stack is vertical and the path extends vertically, each magnetic elevator device is arranged as follows. Each contact rail, which has a lower end and an upper end, comprises two portions, namely, a magnetic portion and a non-magnetic, low-friction portion. The magnetic portion has a front surface which confronts but is spaced from the stack and the path, and which is sloped from vertical toward the stack (proceeding from its lower end toward its upper end). Thus, the magnetic portion provides a magnetic field of decreasing reluctance which defines a point of minimum reluctance therealong (i.e., at or near the upper end of the contact rail). The non-magnetic portion of the contact rail (which is fabricated of non-magnetic low-friction material such as Teflon TM, other plastic or stainless steel, for example, and which is rigidly secured to the magnetic portion of the contact rail as by an adhesive or other suitable means) also extends vertically and has a front surface confronting and engageable with the stack and object moving upwardly along the path. This surface is vertical and slidably engages the edge of an object being magnetically raised to guide it upwardly and to maintain the object edge at predetermined distances from the sloped surface of the magnetic portion of the contact rail as the object moves upwardly toward the point of minimum reluctance.

In one cycle of operation of the apparatus, assuming that a vertical stack of objects is provided and the magnetic elevator devices are magnetized, the pair of contact rails of opposite polarity in each elevator device engage the associated edges of the objects in the stack and form a magnetic circuit therewith. As a result, a portion of each object assumes the same polarity as the one beneath it and is repelled upwardly thereby toward the point of minimum reluctance on the elevator device. The uppermost object reaches that point (which is also the transport position) and the object immediately beneath or adjacent the uppermost sheet is vertically spaced therefrom but is ready to move to the point of minimum reluctance where the uppermost sheet is removed. The sensing means of the control signal ascertains when an object reaches the transport position and operates the transport means to move the lifting magnet into an initial position where it can engage the object (if it is not already in that position), then enerigizes the lifting magnet so that it becomes magnetically attached to the object, then moves the lifting magnet and the object to the other location, then de-energizes the lifting magnet to release the object, and then returns the lifting magnet to its initial position in readiness for the next cycle of operation.

If active magnetic elevator devices are employed, the sensing means can ascertain whether or not the uppermost object is precisely positioned in the transport position and, if not, the control means controls energization of the coil in the electro-magnet of the active elevator device to effect movement of the object into precise position.

The apparatus and magnetic elevator devices in accordance with the present invention offer numerous advantages over the prior art. For example, the magnetic elevator devices alone raise and separate the objects in the stack and there is no need to employ additional equipment to raise the stack as the top objects are removed therefrom. The magnetic elevator devices are simpler in construction and more effective than prior art devices. The magnetic elevator devices can embody permanent magnets or electro-magnetic, depending on specific industrial applications. The magnetic elevator device employing an electro-magnet, however, is especially well-suited for use in apparatus which employs electric control means for adjusting the magnetic flux field to precisely position an object at the transport position. Each magnetic elevator device employs two contact rails of opposite polarity so that a single device can be used alone, for example, to raise one edge of a sheet or one end of a rod, if the industrial use so requires. However, a plurality of magnetic elevator devices can be employed in various combiations and arrangements to move the entire sheet or rod. The magnetic elevator device employs in each contact rail a magnetic portion which is suitably designed and shaped to define a point of minimum reluctance. The non-magnetic portion in each contact rail serves the dual purposes of maintaining proper spacing between an object and the magnetic portion of the control rail to effect object movement toward the point of minimum reluctance. The non-magnetic portion also facilitates slidable guiding movement of the object along the path. The magnetic elevator device is relatively simple and straight-forward in design and mode of operation, is economical to manufacture, lends itself to a wide variety of industrial uses, is reliable in use, and employs no moving parts. Various arrangements of a plurality of various types of magnetic elevator devices and the control means therefor are possible. Other objects and advantages will hereinafter appear.

DRAWINGS

FIG. 1 is an isometric schematic diagram of apparatus in accordance with the invention and showing: a stack of magnetizable objects (sheets) to be separated, positioned, and transported; a plurality of (four) active or controllable type magnetic elevator devices in accordance with the invention; transport means for transporting the uppermost separated object (sheet) away from the stack; and control means comprising a plurality of (four) object position sensing devices for operating the transport means and for operating the active magnetic elevator devices;

FIG. 6 is an isometric view of the magnetic core and electric coil of the device shown in FIGS. 2 through 5;

FIG. 7 is an enlarged cross-section view taken on line 7—7 of FIG. 1 and showing the construction of contact rails of opposing devices and the disposition of the sheets in the stack therebetween;

FIG. 8 is a view similar to FIG. 7 but showing only a single active device and showing magnetizable rods, instead of sheets, as the object associated therewith;

FIG. 9 is a view similar to FIG. 2 but showing two magnetizable sheets associated therewith and indicate schematically the magnetic flux path through the device and the sheets;

FIG. 10 is an isometric view of a passive magnetic elevator device in accordance with the invention and which includes a permanent magnet;

FIG. 11 is an enlarged cross-section view taken on line 11—11 of FIG. 10 and shows the construction of the contact rails of a pair of passive type devices in association with sheets; and FIG. 12 is a view similar to FIG. 11 but showing the one passive type of device associated with magnetizable rods, instead of sheets.

DESCRIPTION OF THE PREFERRED EMBODIMENTS

Apparatus in accordance with the invention is employed with a stack 10 of magnetizable objects, such as iron or steel sheets 12A (FIGS. 1, 7, 9, 11) or rods 12B (FIGS. 8, 12). Each sheet 12A has four lateral edges and one sheet lays on top of another in a stack 10. Each rod 12B has a lateral edge and is disposed in a bin (not shown) and one lays atop another to form a stack 10.

The apparatus includes magnetic elevator means which operates to separate the objects and to move the uppermost object vertically along a first path P1 (FIGS. 1, 7, 8, 9, 11, 12) to a predetermined fixed transport position TP. Each object in position TP is separated or spaced from the next adjacent object in the stack.

The apparatus, in accordance with the invention, further comprises transport means which operates to move an object away from transport position TP along a second path P2 to another position or location (not shown) wherein the object can be subjected to an industrial process, such as cutting, punching, stamping, bending, etc. Path P2 is shown in FIG. 1 as extending upward for a short distance and then extending horizontally, but could follow whatever route is necessary to enable the ojbect to clear the apparatus and move to the other location.

Figure 1:
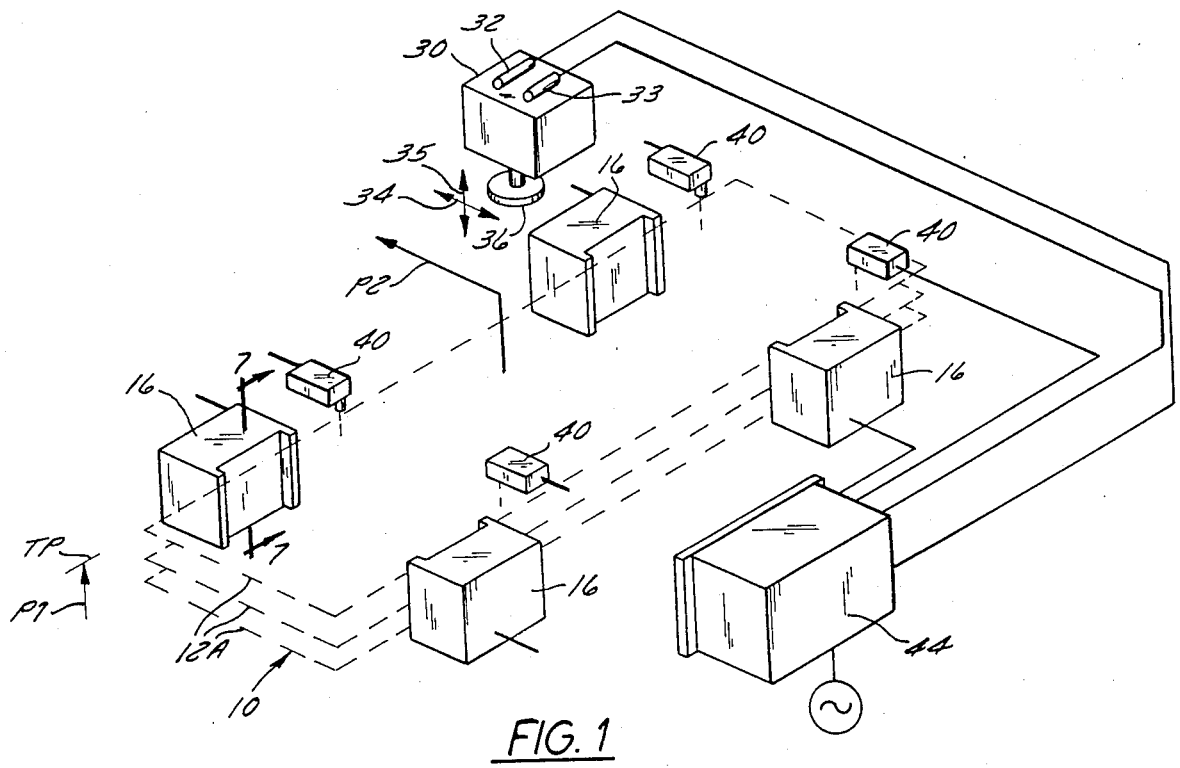

As FIG. 1 shows, apparatus in accordance with the invention further comprises control means for operating the transport means and the magnetic elevator means which comprises magnetic elevator devices 16 which are arranged and constructed in accordance with the invention.

More specifically, FIG. 1 shows four magnetic elevator devices 16 stationarily disposed on opposite sides of stack 10 and alongside path P1. The magnetic elevator devices 16 operate to separate the sheets 12A in stack 10 to move the uppermost sheet upward along path P1 to transport position TP. Magnetic elevator device 16 is an "active" type device which, as FIG. 6 shows, employs an electro-magnet structure 18 comprising a magnet core 20 and electric coil 22 and wherein magnetic flux density is adjustably variable or controllable by controlling current flow to coil 22. However, FIGS. 10, 11, 12 show an elevator device 24 of a "passive" type in which a permanent magnet structure 28 is employed and magnetic flux density is fixed and not variable or controllable.

FIG. 1 shows the transport means for releasbly engaging a sheet 12A in transport position TP and for moving it along path P2 away from the transport position and away from stack 10 to another position or location (not shown) wherein it is deposited for further processing. The control system can position the sheet anywhere along the magnet, by means of closed position loop control of the magnetic flux, but the transport position TP is herein depicted as the point of minimum reluctance for purposes of discussion. The transport means could take various forms but is disclosed herein as comprising a transport head or housing 30 which is selectively movable horizontally and vertically in the direction of the arrows 34 and 35, respectively, by means of controllable electric motors 32 and 33, respectively, in housing 30. The transport means further comprises a downwardly extending selectively energizable electro-magnetic lifting device 36 mounted on and movable with transport head 30. When lifting magnet 36 is electrically energized, it magnetically engages uppermost sheet 12A and, when de-energized, releases the sheet. When each sheet 12A reaches transport position TP, it is engaged by lifting device 36 and is moved along path P2 clear of the elevator devices 16 and away from position TP.

FIG. 1 shows that the control means includes stationary sheet position sensing means or feedback devices 40 for providing electric feedback signals when an uppermost sheet 12A reaches transport position TP and further includes a programmable computer or controller 44 to receive the feedback signals and to effect operation of the transport means when the sheet arrives at transport position TP. Four sensing devices 40 are shown in FIG. 1 and may, for example, take the form of photo-responsive, magnetically responsive, or sonically responsive sensors which do not physically contact the objects, or could be some form of contact responsive sensing switch. Preferably, each sensing device 40 determines the actual position of its associated sheet edge relative to transport position TP and provides a feedback signal usable by controller 44 to quantify the detected actual position and its distance relative to transport position TP. If active controllable type magnetic elevator devices 16 are employed in the apparatus, as shown in FIG. 1, then the devices 40 are operable to sense the position of uppermost sheet 12A relative to transport position TP and, if necessary, cause controller 44 to control flux density in the active elevator devices 16 to precisely position the sheet in transport position TP before effecting operation of the transport means.

Programmable computer or controller 44, which is of a known type, receives electrical input or feedback signals from each sensing device 40, ascertains if and when all sheet edges of uppermost sheet 12A are simultaneously in transport position TP, if necessary, actuates one or more of the active magnetic elevator devices 16 to move a misaligned respective sheet edge into transport position TP, and then operates the transport means. The position feedback signal is sent to computer 44, which uses this information to adjust the current in the electro-magnet 18 of that magnetic lifting device 16 which may require adjustment to effect sheet positioning. Thus, the top sheet 12A to be elevated can be moved to any desired position relative to the magnetic lifting devices 16 as hereinafter explained. Each electromagnet lifting device 16, as shown in FIG. 1, can be provided with a separate associated sensing device 40 or a plurality of electro-magnet devices 16 can share a common sensing feedback device 40.

Operation of the transport means typically involves the steps of: moving transport housing 30 and its pickup magnet 36 to sheet pick-up position wherein magnet 36 engages uppermost sheet 12A which is in transport position TP, energizing magnet 36 so it magnetically attracts and holds the sheet, raising and moving housing 30 and magnet 36 so as to lift and move the sheet along path P2, depositing the sheet at some remote location, and returning housing 30 and magnet 36 to sheet pick-up position.

Figures 2, 3, 4, 5:
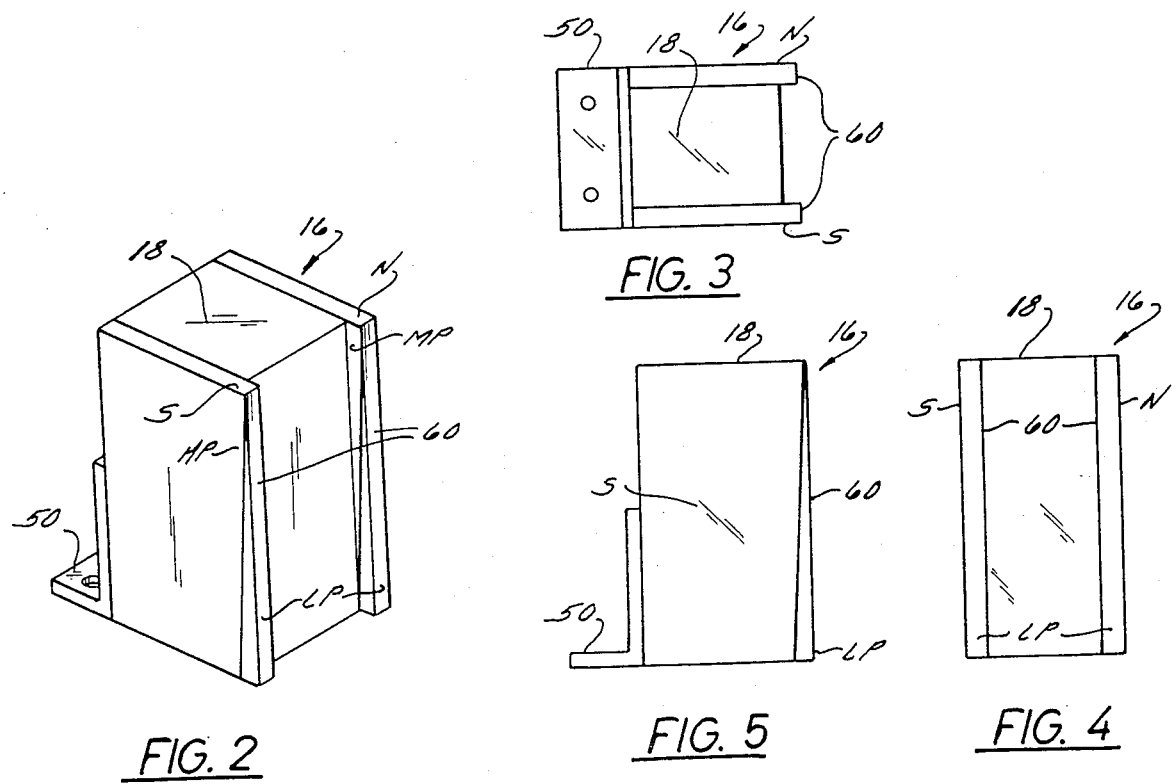
FIG. 2 is an elevated isometric view of one of the active type magnetic elevator devices shown in FIG. 1 and which includes an electro-magnet.
FIG. 3 is a top plan view of the device of FIG. 2.
FIG. 4 is a front elevation view of the device of FIG. 2.
FIG. 5 is a side elevation view of the device of FIG. 2.

Referring to FIGS. 2 through 11, the two types of magnetic elevator devices 16 and 24 will now be described in detail. Each magnetic elevator device in accordance with the present invention (whether an active type device 16 of FIGS. 2 through 9 or a passive type device 24 of FIGS. 10 through 12) comprises a supporting structure including a support bracket 50 for stationarily mounting the device in fixed position relative to stack 10, a magnetic structure (electro-magnet 18 or permanent magnet 28) having a core with spaced apart side plates or pole pieces N and S of opposite polarity (north and south), and a pair of elongated, laterally spaced apart contact rails 60. As FIGS. 2 and 10 show, each contact rail 60 comprises two portions, namely, a magnetic portion MP which forms a portion of a respective side plate N or S and a non-magnetic, low-friction portion LP. Each magnetic elevator device 16 or 24 is adapted to be disposed adjacent a side of stack 10 and adjacent the path P1 along which the object (sheet or rod) travels. The contact rails 60 extend vertically and are adapted to engage a side edge of an object in the stack 10 (sheet 12A or rod 12B), as well as those objects being moved along path P1 to transport position TP.

In a typical installation, as shown in FIG. 1, wherein stack 10 is vertical and path P1 extends vertically, each magnetic elevator device 16 or 24 is disposed and arranged as follows. FIGS. 1, 6 and 9 show an active elevator device 16 but the following features are also found in passive device 24. Thus, the vertically extending magnetic portion MP (which is embodied in a pole piece N or S) has a front surface 64 which confronts but is spaced from stack 10 and path P1, and which is sloped from vertical toward the stack (proceeding from its lower end toward its upper end). Thus, magnetic portion MP provides a magnetic field of decreasing reluctance which defines a point of minimum reluctance MR therealong (i.e., at or near the upper end of a contact rail 60). The vertically extending non-magnetic portion LP of a contact rail 60 is fabricated of non-magnetic, low-friction material such as Teflon ™, other plastic material or stainless steel, for example, and is rigidly secured to the magnetic portion MP of a contact rail 60 as by an adhesive or other suitable means (not shown). Non-magnetic portion LP has a front surface 66 confronting and engageable with stack 10 and objects moving upwardly along path P1. This surface 66 is vertical and, as FIGS. 7, 8, 9, 11, 12 make clear, slidably engages the edge of an object (sheet or rod) being magnetically raised so as to guide it upwardly and to maintain the object edge at predetermined distances from the sloped surface 64 of the magnetic portion MP of contact rail 60 as the object moves upwardly toward the point of minimum reluctance MR (which is also the transport position TP in the embodiment depicted). This transport position can be different from the minimum reluctance point shown, by utilizing closed loop control of the magnetic field.

More specifically, when coil 22 of a device 16 is energized, one side plate or pole piece N becomes the north magnetic pole and the other side plate or pole piece S becomes the south pole. The distance between the object to be elevated and the magnetic portion MP of a pole piece N or S is determined by the thickness of non-magnetic, low-friction portion LP. As FIG. 9 makes clear, this allows the length of the magnetic flux path F (and thus magnetic reluctance) to vary depending on the point of contact of the object to be elevated with a contact rail 60. If the magnetic field is strong enough, the object will move toward and stop at the point of minimum reluctance MR, which can be located at any point along the contact rail 60, depending on the choice of position of the shortest flux path F. Each contact rail 60 has a point MR where the magnetic reluctance is a minimum. A device 16 or 24 can be designed so that the point of minimum reluctance MR can be operated at any point along a contact rail 60. As FIG. 9 shows, a flux path F runs through the magnet core 20 of the magnet, through one side plate N, across the air gap (space including the portion LP of a contact rail 60) to the sheet 12A to be elevated, through a portion of the sheet 12A, across the other air gap (portion LP), into the other side plate S, and back into electromagnet core 20. When a sheet 12A contact both contact rails 60 in one magnetic elevator device 16, the sheet completes the magnetic circuit. At the points of contact, the sheet then has its own magnetic polarity, which is opposite the polarity of the associated contact rail 60. All sheets in contact with a particular contact rail 60 have the same polarity relative to one another. Since the sheets all have the same polarity in the vicinity of a contact rail 60, adjacent sheets will be repelled from each other. The sheets, when separated, are attracted to point MR where the magnetic flux path F is shortest.

One cycle of operation of the apparatus will now be described in connection with FIG. 1. Assume that a vertical stack 10 of sheets 12A is provided, that the active magnetic elevator devices 16 around stack 10 are magnetized (by energization of their coils 22), and that the pair of contact rails 60 of opposite polarity in each elevator device 16 engage the associated edges of the sheets 12A in the stack and that each device 16 forms a magnetic circuit with the sheets as shown in FIG. 9. Also assume that the transport means have moved lifting magnet 36 into an initial position where it can engage the object. As a result, a portion of each sheet 12A assumes the same polarity as the corresponding portion of the sheet beneath it and is repelled upwardly thereby toward the point of minimum reluctance MR on an elevator device 16. Thus, each entire sheet 12A is elevated. The uppermost sheet 12A reaches that point MR (which is also the transport position TP) and the sheet immediately beneath or adjacent the uppermost sheet is vertically spaced therefrom because of repulstion (see FIG. 7) but is ready to move to the point of minimum reluctance MR whereat the uppermost sheet is removed. The sensing devices are used to sense and measure sheet position in order to control the sheet's position. The sensing devices 40 of the control means ascertain when all sides of a sheet 12A reach transport position TP and controller 44 energizes lifting magnet 36 so that it becomes magnetically attached to sheet 12A, and then moves the lifting magnet 36 and the sheet to the other location. Controller 44 then deenergizes lifting magnet 36 to release the sheet, and then returns lifting magnet 36 to its initial position in readiness for the next cycle of operation. As uppermost sheet 12A is removed, the next sheet moves up to the point of minimum reluctance MR (transport position TP) until no more sheets are left in stack 10.

When active type magnetic elevator devices 16 are employed, as shown in FIG. 1, the sensing means 40 ascertain whether or not the uppermost sheet 12A is precisely positioned in transport position TP and, if not, controller 44 controls energization of the coils 22 in the active elevator devices 16 to effect movement of the sheet into precise transport position. This is a closed loop position control.

As previously explained, device 16 is an active electromagnetic type of device, and device 24 is a passive permanent magnet type of device. Both types of devices operate to separate and position magnetic objects, such as magnetizable sheets 12A or rods 12B, to enable other equipment, such as transport means, to easily remove one object at a time from a stack or bin to another location. However, passive device 24, unlike active device 16, cannot be adjusted flux-wise by controller 44 to enable adjustable positioning of an object being raised.

We claim:

1. Apparatus for separating and raising the uppermost object in a vertical stack, such as a steel sheet or rod, along a vertical path to a predetermined transport position and for moving the object away from said transport position along a path transverse to said vertical path, said apparatus comprising:

at least one magnetic elevator device for disposition adjacent one side of said vertical stack and cooperable with one edge of an object to separate and raise the uppermost object in said stack along said vertical path to said predetermined transport position and to maintain the uppermost object stationary in said predetermined transport position, said magnetic elevator device comprising:

a magnetic structure defining two magnetic poles of opposite polarity;

and a pair of contact rails connected to said magnetic structure and laterally spaced apart from each other in a direction transverse to said vertical path;

each contact rail comprising a magnetic portion and a non-magnetic portion rigidly secured to said magnetic portion;

the magnetic portions of said pair of contact rails being of opposite magnetic polarity with respect to one another;

said magnetic portion of each contact rail having a bottom end, a top end, and a front surface which slopes toward said vertical path proceeding in a direction from said bottom end toward said top end so as to define a point of minimum reluctance near said top end toward which said uppermost object moves and whereat it comes to rest, said point defining said transport position;

said non-magnetic portion of each contact rail comprising non-magnetic non-metallic low-friction material disposed between said front surface of its associated magnetic portion and said vertical path;

said non-magnetic portion having a vertically disposed front surface which is slidably engageable with said one edge of an object moving vertically upward along said vertical path so as to facilitate movement of said object along said vertical path and so as to maintain said one edge of said object at a predetermined distance from the sloped front surface of the magnetic portion of the associated rail;

transport means operable to releasably engage an object in said transport position and to move it to another position away from said transport position;

and control means for sensing the position of said uppermost object relative to said transport position and, when said uppermost object reaches said transport position, for operating said transport means to engage and to move said object away from said transport position.

2. Apparatus according to claim 1 wherein said magnetic structure comprises a permanent magnet.

3. Apparatus according to claim 1 wherein said magnetic elevator device is of a type wherein the magnetic flux density is selectively adjustable to effect positioning of each object relative to said transport position, and wherein said control means is further operable to effect adjustment of said flux density to adjustably position said uppermost object relative to said transport position prior to operating said transport means.

4. Apparatus according to claim 3 wherein said magnetic structure comprises an electro-magnet having a magnet core and electric coil means connected to said control means.

5. A magnetic elevator device for disposition adjacent one side of a vertical stack of magnetizable objects, such as steel sheets or rods, and cooperable with one edge of an object to separate and raise the uppermost object in said stack along a vertical path to a predetermined position and to maintain the uppermost object stationary in said predetermined position, said magnetic elevator device comprising:

a magnetic structure defining two magnetic poles of opposite polarity;

and a pair of contact rails connected to said magnetic structure and laterally spaced apart from each other in a direction transverse to said vertical path;

each contact rail comprising a magnetic portion and a non-magnetic portion rigidly secured to said magnetic portion;

the magnetic portions of said pair of contact rails being of opposite magnetic polarity with respect to one another;

said magnetic portion of each contact rail having a bottom end, a top end, and a front surface which slopes toward said vertical path proceeding in a direction from said bottom end toward said top end so as to define a point of minimum reluctance near said top end toward which said uppermost object moves and whereat it comes to rest;

said non-magnetic portion of each contact rail comprising non-magnetic non-metallic low-friction material disposed between said front surface of its associated magnetic portion and said vertical path;

said non-magnetic portion having vertically disposed front surface which is slidably engageable with said one edge of an object moving vertically upward along said vertical path so as to facilitate movement of said object along said vertical path and so as to maintain said one edge of said object at a predetermined distance from the sloped front surfce of the magnetic portion of the associated contact rail.

6. A magnetic elevator device according to claim 5 wherein said magnet structure comprises a permanent magnet.

7. A magnetic elevator device according to claim 5 wherein said magnet structure comprises an electromagnet having a magnetizable core and an electrically energizable coil.

* * * * *